United States Patent
Kwatra et al.

(10) Patent No.: US 8,571,349 B1
(45) Date of Patent: Oct. 29, 2013

(54) IMAGE ENHANCEMENT THROUGH DISCRETE PATCH OPTIMIZATION

(75) Inventors: Vivek Kwatra, Santa Clara, CA (US); Mei Han, Palo Alto, CA (US); Jay N. Yagnik, Mountain View, CA (US)

(73) Assignee: Google Inc, Mountain View, CA (US)

( * ) Notice: Subject to any disclaimer, the term of this patent is extended or adjusted under 35 U.S.C. 154(b) by 0 days.

(21) Appl. No.: 13/619,624

(22) Filed: Sep. 14, 2012

Related U.S. Application Data (63) Continuation of application No. 12/430,812, filed on Apr. 27, 2009, now Pat. No. 8,396,325.

(51) Int. Cl.
*G06K 9/36* (2006.01)

(52) U.S. Cl.
USPC ............................ 382/284; 382/294; 382/299

(58) Field of Classification Search
USPC .................................................. 382/284, 299
See application file for complete search history.

(56) References Cited

U.S. PATENT DOCUMENTS

| | | | |
|---|---|---|---|
| 5,325,449 A * | 6/1994 | Burt et al. ...................... | 382/240 |
| 5,488,674 A * | 1/1996 | Burt et al. ...................... | 382/284 |
| 6,201,541 B1 * | 3/2001 | Shalom et al. ................. | 345/419 |
| 6,240,423 B1 * | 5/2001 | Hirata ............................. | 1/1 |
| 6,249,616 B1 * | 6/2001 | Hashimoto .................... | 382/284 |
| 6,463,426 B1 * | 10/2002 | Lipson et al. .................. | 1/1 |
| 6,466,694 B2 * | 10/2002 | Kamada et al. ............... | 382/181 |
| 6,535,650 B1 * | 3/2003 | Poulo et al. .................... | 382/284 |
| 6,587,581 B1 | 7/2003 | Matsuyama et al. | |
| 6,675,174 B1 * | 1/2004 | Bolle et al. .................... | 1/1 |
| 6,681,056 B1 * | 1/2004 | Tseng et al. ................... | 382/282 |
| 6,683,984 B1 * | 1/2004 | Simske et al. ................. | 382/190 |
| 6,701,026 B1 | 3/2004 | Zheng et al. | |
| 6,762,769 B2 * | 7/2004 | Xu et al. ........................ | 345/582 |
| 6,826,300 B2 * | 11/2004 | Liu et al. ....................... | 382/159 |
| 6,898,331 B2 * | 5/2005 | Tiana ............................. | 382/274 |
| 7,120,626 B2 * | 10/2006 | Li et al. .......................... | 1/1 |
| 7,358,994 B2 | 4/2008 | Yano | |
| 7,366,323 B1 | 4/2008 | Yao et al. | |
| 7,376,251 B2 * | 5/2008 | Stober ............................ | 382/112 |
| 7,388,979 B2 | 6/2008 | Sakai et al. | |
| 7,577,313 B1 | 8/2009 | Georgiev | |
| 7,653,491 B2 | 1/2010 | Schadt et al. | |
| 7,724,960 B1 * | 5/2010 | Mikhael et al. ............... | 382/190 |
| 7,734,097 B1 * | 6/2010 | Porikli et al. .................. | 382/190 |
| 7,778,488 B2 * | 8/2010 | Nord et al. ..................... | 382/284 |
| 8,090,429 B2 * | 1/2012 | Vija et al. ....................... | 600/427 |

(Continued)

OTHER PUBLICATIONS

Hays, J., et al., "Scene completion using millions of photographs," ACM Transactions on Graphics GRAPH, 2007, vol. 26, No. 3.*

(Continued)

*Primary Examiner* — Gandhi Thirugnanam
(74) *Attorney, Agent, or Firm* — Fenwick & West LLP (57) ABSTRACT

An image processing system enhances the resolution of an original image using higher-resolution image data from other images. The image processing system defines a plurality of overlapping partitions for the original image, each partition defining a set of non-overlapping site patches. During an optimization phase, the system identifies, for site patches of the original images, label patches within related images that are of most relevance. During a rendering phase independent of the optimization phase, an output image with enhanced resolution is synthesized by substituting, for site patches of the original image, the identified relevant label patches from the related images.

20 Claims, 5 Drawing Sheets

(56) References Cited

U.S. PATENT DOCUMENTS

| | | | |
|---|---|---|---|
| 8,131,786 B1* | 3/2012 | Bengio et al. | 707/748 |
| 8,391,634 B1 | 3/2013 | Kwatra et al. | |
| 8,396,325 B1* | 3/2013 | Kwatra et al. | 382/284 |
| 2001/0055429 A1* | 12/2001 | Hirosawa et al. | 382/284 |
| 2003/0016881 A1 | 1/2003 | Matsuura | |
| 2003/0190090 A1* | 10/2003 | Beeman et al. | 382/284 |
| 2004/0032979 A1* | 2/2004 | Honda et al. | 382/145 |
| 2005/0149494 A1* | 7/2005 | Lindh et al. | 707/3 |
| 2005/0179910 A1 | 8/2005 | Bartov | |
| 2006/0017739 A1* | 1/2006 | Fang et al. | 345/582 |
| 2006/0034540 A1 | 2/2006 | Zavadsky et al. | |
| 2006/0188113 A1 | 8/2006 | Tice et al. | |
| 2007/0104389 A1 | 5/2007 | Wells | |
| 2007/0183629 A1* | 8/2007 | Porikli et al. | 382/103 |
| 2007/0280556 A1* | 12/2007 | Mullick et al. | 382/294 |
| 2007/0282935 A1 | 12/2007 | Khan et al. | |
| 2007/0286523 A1 | 12/2007 | Kim et al. | |
| 2008/0025635 A1 | 1/2008 | Han et al. | |
| 2008/0130960 A1* | 6/2008 | Yagnik | 382/118 |
| 2008/0235216 A1* | 9/2008 | Ruttenberg | 707/5 |
| 2009/0003725 A1 | 1/2009 | Merkel et al. | |
| 2010/0013965 A1 | 1/2010 | Pugh et al. | |
| 2010/0080472 A1 | 4/2010 | Asano | |
| 2010/0272357 A1 | 10/2010 | Maxwell et al. | |
| 2011/0280453 A1* | 11/2011 | Chen et al. | 382/113 |
| 2011/0297369 A1 | 12/2011 | Kumaran et al. | |
| 2011/0311129 A1 | 12/2011 | Milanfar et al. | |
| 2012/0141044 A1* | 6/2012 | Kwatra et al. | 382/274 |
| 2012/0281923 A1* | 11/2012 | Irani et al. | 382/218 |

OTHER PUBLICATIONS

Kwang In Kim and Younghee Kwon, "Example-Based Learning for Single-Image Super Resolution", Proc. DAGM, pp. 456-465 2008.*

Freeman, W.T., Jones, T.R., Pasztor, E.C.: Example-based super-resolution. IEEE Computer Graphics and Applications 22(2), 56-65 (2002).*

Qiang Wang, Xiaoou Tang, Harry Shum, "Patch Based Blind Image Super Resolution", Proceedings of the Tenth IEEE International Conference on Computer Vision (ICCV'05), 2005, p. 1-8.*

Michael Elad and Arie Feuer, "Restoration of a Single Superresolution Image from Several Blurred, Noisy, and Undersampled Measured Images", IEEE Transactions on Image Processing, Vol. 6, No. 12, Dec. 1997, p. 1646-1658.*

Guoping Qiu, "Interresolution Look-up Table for Improved Spatial Magnification of Image", Journal of Visual Communication and Image Representation 11, 360-373 (2000).*

Lin Liang, Ce Liu, Ying-Qing Xu, Baining Guo, and Heung-Yeung Shum, "Real-Time Texture Synthesis by Patch-Based Sampling", ACM Transactions on Graphics, vol. 20, No. 3, Jul. 2001, pp. 127-150.*

S. Baker and T. Kanade "Limits on Super-Resolution and How to Break Them", IEEE Trans. Pattern Analysis and Machine Intelligence, vol. 24, No. 9, pp. 1-37, 2002.*

Xiaoguang Li, Kin Man Lam, Guoping Qiu, Lansun Shen, Suyu Wang, "Example-based image super-resolution with class-specific predictors", J. Vis. Commun. Image R. 20 (2009) 312-322.*

\* cited by examiner

Original Image 310

FIG. 3A

Related image 340A

FIG. 3B

Related image 340B

IMAGE ENHANCEMENT THROUGH DISCRETE PATCH OPTIMIZATION

CROSS REFERENCE TO RELATED APPLICATIONS

This application is a continuation of U.S. application Ser. No. 12/430,812, filed Apr. 27, 2009, entitled "Image Enhancement Through Discrete Patch Optimization", which is incorporated herein by reference. This application is related to U.S. application Ser. No. 12/430,791, filed on Apr. 27, 2009, entitled "Large Scale Patch Search".

BACKGROUND

1. Field of Art

The present invention generally relates to the field of digital imaging, and more specifically, to methods of enhancing digital images.

2. Background of the Invention

Many current information systems store large quantities of digital images, such as map applications providing views of the surrounding area for a given map location. However, much of this image data has low resolution, resulting in a low-quality viewing experience for users of the systems. For example, some map systems contain many images of streets and buildings, sometimes obtained from multiple sources, such as aerial and ground photos. Such images may be taken from a large distance, thereby providing broad coverage, e.g. of buildings in a given area, but resulting in a lack of the resolution needed to provide a user with fine detail. As another example, some digital videos of a digital video hosting system may be stored in a lossy compression format, sometimes resulting in significant loss of image quality. As a result, these systems provide users with image data of less than desirable quality.

SUMMARY

An image processing system is configured to enhance the resolution of a image using higher-resolution image data from other images. Specifically, given an original image for which resolution enhancement is desired and one or more related images having resolution greater than that of the original image, the system divides the images into "patches" (pixel regions). During an optimization phase, the system identifies, for "sites" (patches of the original images aligned on a grid defined by a partition), "labels" (patches in the related images) that are of most relevance. During a rendering phase independent of the optimization phase, an output image with enhanced resolution is then synthesized by incorporating, for sites of the original image, the identified relevant labels, e.g. by substituting the labels for the patches, or by combining the labels with the patches or with other labels.

The optimization phase comprises defining a plurality of partitions for the original image, each partition defining a plurality of non-overlapping site patches. Then, for a site, a number of candidate labels are identified in the related images as being potentially relevant to the site. The candidate labels include patches predicted by overlapping sites, nearest neighbors of the site itself, nearest neighbors of patches predicted by overlapping sites, and nearest neighbors of images synthesized using current labels at sites of the original image. The candidate labels are then evaluated to determine their values according to an energy function, the energy function evaluating both a degree to which a label matches the site, and a degree to which the label matches overlapping sites from other partitions. The labels with the best (lowest) values of the energy function are then selected as the labels for the site. The process of finding candidates and selecting those with the best values of the energy function is applied iteratively until, for example, a maximum number of iterations has been performed, or a convergence condition has been satisfied.

The rendering phase uses the final set of labels selected by the optimization phase to produce an enhanced output image. The independence of the rendering phase from the optimization phase allows different rendering algorithms to be selected to produce a final output image. For example, in one embodiment, the renderings of the various partitions are averaged. In another embodiment, their medians are computed. In another embodiment, a graph cut algorithm is employed to stitch overlapping patches together. In still another embodiment, Poisson blending is employed to seamlessly combine the patches.

In one embodiment, a computer-implemented method of enhancing an image comprises receiving an original image having a set of sites and receiving one or more images related to the original image. For a first site of the set of sites, the method performs operations comprising identifying a plurality of candidate labels from the one or more related images, selecting a label for the first site, the label selected from the candidate labels responsive at least in part to evaluating a degree of difference between the label and the first site, and storing an identifier of the selected label in association with the first site.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
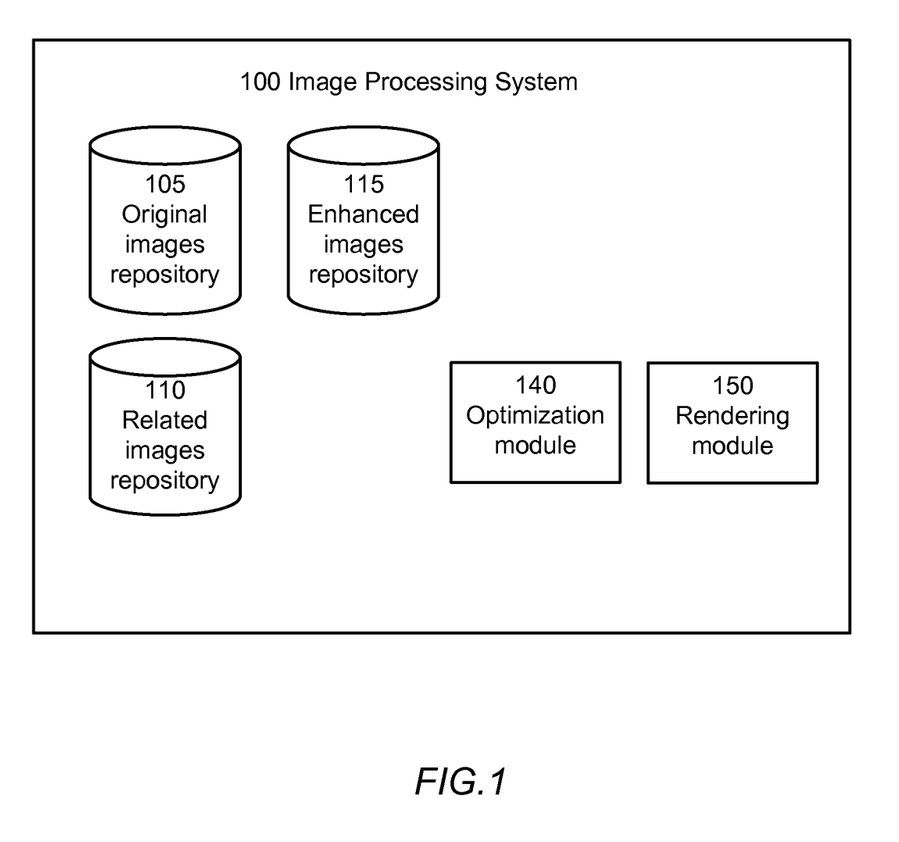
FIG. 1 is a block diagram of an image processing system in accordance with one embodiment of the present invention.

FIG. 1 is a block diagram of an image processing system in accordance with one embodiment of the present invention. An image processing system 100 processes original images, substituting portions of higher-resolution related images to produce enhanced images of improved quality. The original images may be individual images, or frames of a video, for example.

The image processing system 100 comprises an original images repository 105, which stores a set of images having a resolution lower than desired. The original images repository 105 may also contain videos, the frames of which have a lower than desired resolution. The term "image" as employed hereinafter includes image data in general, such as individual still image files, or image data from a video, and thus is not limited to still images. The images within the original images repository 105 may be obtained from a variety of sources, such as from an organization producing aerial or street view images of a portion of a city for use with a map system, such as GOOGLE MAPS, STREETVIEW, and GOOGLE EARTH. Likewise, images (including videos) may be obtained from users, e.g. as submitted by a user uploading images to a photo repository such as PICASA WEB, or a video repository such as YOUTUBE or GOOGLE VIDEO.

The image processing system additionally comprises a related images repository 110, which includes images generally having a higher resolution than those within the original images repository 105. The image processing system 100 may thus use images within the related images repository to enhance the resolutions of images within the original images repository.

The image processing system further comprises an enhanced images repository 115, which includes images from the original images repository 105, as enhanced through the substitution of higher-resolution data from the images of the related images repository 110.

The repositories 105-115 can be implemented in a number of different ways in different embodiments, as would be known to one of skill in the art. For example, each image could be stored as a separate file accessible via a file system provided by the operating system, or they could be stored as tables or records of a relational database management system. In the embodiment of FIG. 1, the repositories 105-115 are depicted as constituting three distinct repositories, but they could equivalently be divided differently, such as being combined into a smaller number of repositories, e.g. a single repository. For example, the original and related images could be stored within a single repository. Similarly, the enhanced images could replace their corresponding original images within the original images repository 105, rather than being stored in the separate enhanced images repository 115. Likewise, different types of image data, such as still images and videos, could be stored in separate repositories.

The image processing system 100 also comprises an optimization module 140 and a rendering module 150, which together create the images stored in the enhanced images repository 115. The optimization module 140 associates, for regions of an image from the original images repository, related regions of one or more images from the related images repository 110. The rendering module 150 then combines these associated regions in some manner to create the image with enhanced resolution, which is stored in the enhanced images repository 115. These modules 140-150 are described in more detail below in conjunction with FIGS. 4 and 5.

The image processing system 100 need not be embodied in a single computer but rather may be partitioned across multiple computers or logical storage units in a number of different manners. For example, as noted above the repositories 105-115 may all be stored within a single relational database management system, e.g. as different tables of a single database, or may be stored on separate machines, or may be partitioned or duplicated across machines. The different types of image data within the repositories 105-115, such as still images and videos, may likewise be stored in separate repositories on separate machines, such as one repository for still images and another for video, either of which may be partitioned across multiple machines. Similarly, the optimization module 140 and the rendering module 150 may execute on a machine separate from the repositories 105-115, or separate from each other.

Figure 2:
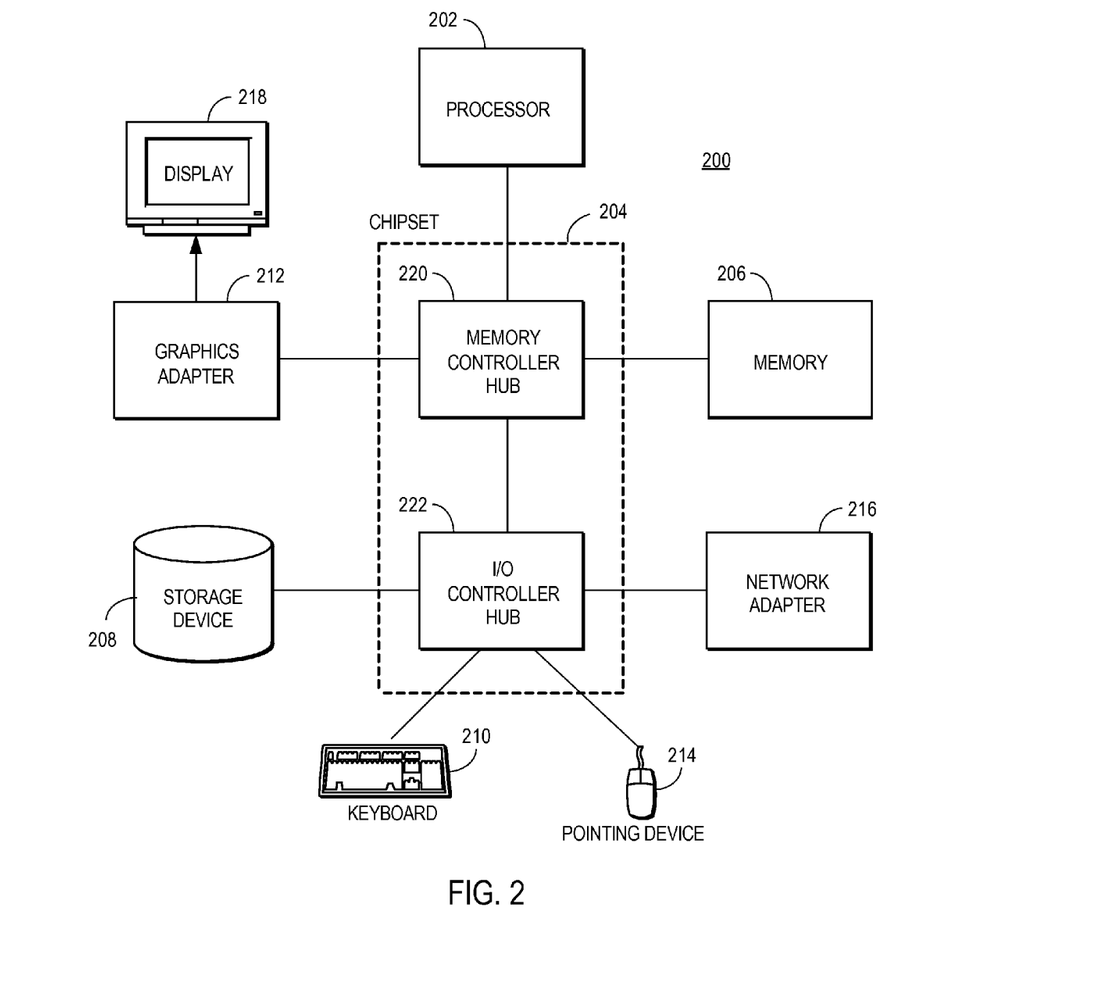
FIG. 2 is a high-level block diagram illustrating physical components of a computer of the image processing system, according to one embodiment FIGS. 3A-3C provide an example of several images illustrating the substitution of higher-resolution portions of related images for lower-resolution portions of an original image.

FIG. 2 is a high-level block diagram illustrating physical components of a computer 200 of the image processing system 100 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3A:
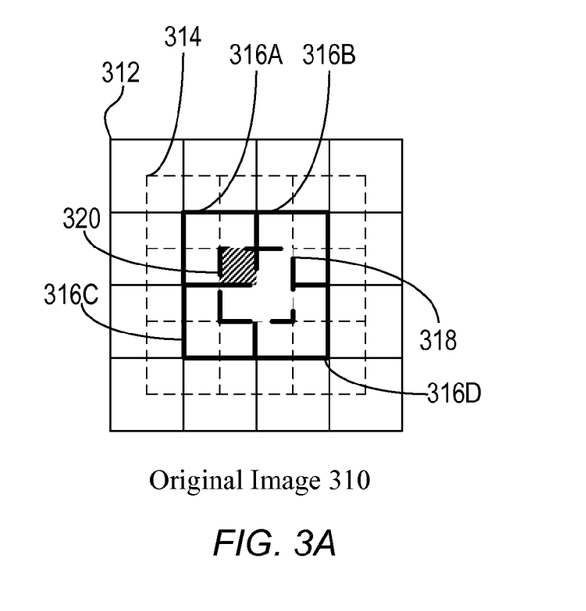
Figure 3B:
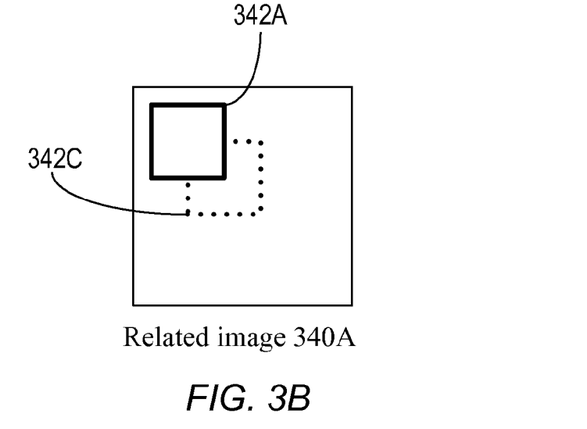
Figure 3C:
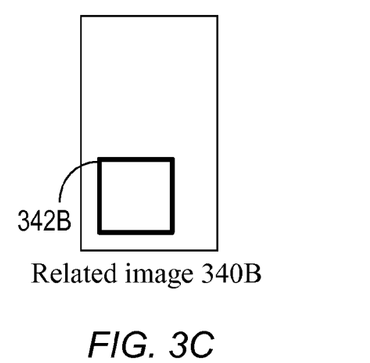

FIGS. 3A-3C provide an example of several images illustrating the substitution of higher-resolution portions of related images for lower-resolution portions of an original image. Illustrated are an original image 310 and two related images 340A and 340B, as taken from the original images repository 105 and related images repository 110, respectively. The original image 310 is subdivided into sets of distinct, non-overlapping "patches" (regions of pixels). In the illustrated example, the patches are square in shape, but could be of other shapes, as well, e.g. rectangular. FIG. 3 illustrates two distinct "partitions," a partition being a set of related patches, aligned on common grid. In one embodiment, the grid is spaced so that the patches all have the same dimensions, e.g. 32×32 pixel squares. The partitions are aligned starting at positions offset from each other by distances less than the length of the edge of a single patch, such that the patches of different partitions overlap, although patches within a given partition do not overlap. For example, a first partition 312, denoted by solid lines and encompassing the entire original image 310, shares its top-left corner with that of the original image, and contains 16 patches. A second partition 314, denoted by broken lines, is inset from the top-left corner of the original image 310 by half the width and height of one patch, and thus defines 9 patches that are not aligned with patches of partition 312. Partition 312 defines patches such as patches 316A-D, and partition 314 defines patches such as patch 318. Note that patches 316A-D and 318, being from different partitions, are not aligned on the same grid, but rather overlap to some degree, and more specifically patches 316A and 318 overlap in region 320. In one embodiment, patches must be wholly contained within the bounds of the original image 310, rather than partially extending outside its bounds. For example, a next patch below or to the right of the bottom-right patch of partition 314 would not lie entirely within the original image 310, and thus is not included within the patches defined by the partition 314. Thus, not all partitions cover every part of the original image 310; rather, some partitions leave uncovered areas, such as the half-patch width near the outer edge of the original image that is created by partition 314. In such an embodiment, any inset partitions (such as partition 314) will necessarily contain fewer patches than the non-inset partition (i.e., partition 312).

FIGS. 3B and 3C further illustrate two related images 340A and 340B. As illustrated, the related images 340 need not be of the same dimensions as the original image 310, nor of the same dimensions as each other. Related image 340A is depicted as having a patch 342A, and related image 340B as having a patch 342B, respectively, the solid outlines of the patches 342 indicating that they correspond to the patches 316 of the partition 312 of the original image 310. The patches 342 when displayed have the same dimensions as the patches 316 to which they correspond, but since their respective related images 340 have higher resolution than that of the original image 310, they contain a greater number of pixels than the patches 316. In order to compare patches as having the same dimensions despite differing pixel resolutions, the original image 310 is enlarged by a resizing operation that includes up-sampling (interpreting the original low-resolution pixels on a larger grid of pixels, e.g. twice the size of the original) and interpolation of pixel values to fill the intermediate empty pixels. This up-sampling procedure enlarges the original image 310 to the resolution of related images 340 but does not change the inherent resolution of the original image, which remains lower than that of the related images.

Throughout the discussion below, the patches of the original image 310 formed by the various partitions of the original image are referred to as "sites" (or "site patches") of the original image, and the patches of the related images as "labels" (or "label patches") corresponding to the sites of the original images. A site may thus be unambiguously identified, for example, by its location, such as the coordinates of its top-left pixel, an identifier of the site's partition and an index of the site patch number within the partition, or an index into a data structure storing information on sites. Since there may be multiple related images 340, a label corresponding to a site may be identified by a tuple <S, I, C>, where S is an identifier of the site to which the label corresponds, I is an identifier of the image (e.g., a pathname to an image stored in the file system, or an index into a data structure storing images in memory) containing the label, and C specifies the location of the label within the image I (e.g., the pixel coordinates of its top-left corner).

It is appreciated that the images, partitions, sites, and labels depicted in FIG. 3 are purely for purposes of example. For example, there may be any number of related images 340, not merely two, and the original image 310 may have any number of distinct partitions. Likewise, a given site 316 may (at certain stages of processing) have any number of associated candidate labels 342. Thus, although the following text refers to the "original image 310," it is appreciated that this refers to an original image in general, rather than the specific original image with the properties depicted in FIG. 3 (i.e., 2 partitions, 16 sites in the first partition, and the like).

Figure 4:
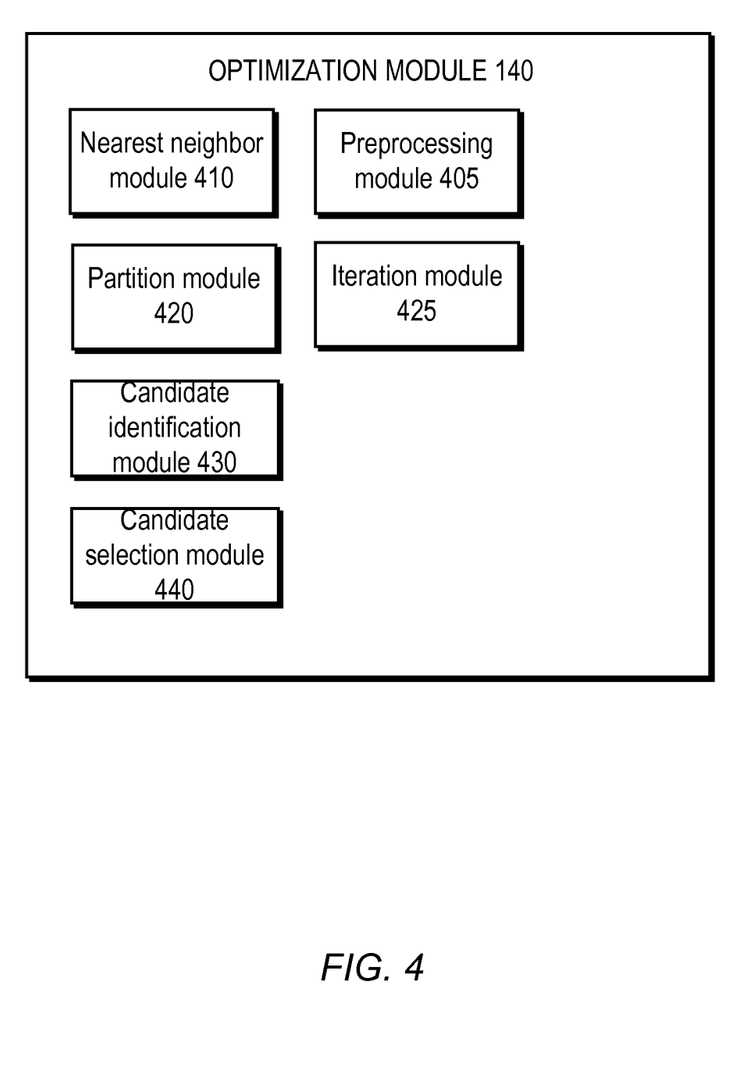
FIG. 4 is a block diagram illustrating a more detailed view of the optimization module of FIG. 1 according to one embodiment.

FIG. 4 is a block diagram illustrating a more detailed view of the optimization module 140 of FIG. 1 according to one embodiment. A preprocessing module 405 performs preliminary operations on the images that are used in the optimization performed by the optimization module 140. For example, the preprocessing module 405 identifies which particular images of the related images repository 110 are related to a given one of the images from the original images repository 105; these related images 340 are later used as the sources for higher-resolution image data to replace portions of the original image 305. In one embodiment, this is accomplished by arranging the related images in data structures such as one or more Hierarchical K-means trees that allow for fast retrieval of related images and labels. Further detail is provided in application Ser. No. 12/430,791.

The preprocessing module 405 further adjusts the pixel resolutions of the original image 310 and related images 340, as described above. For example, the processing module 405 employs up-sampling and interpolation in order to normalize the resolutions of the images for comparison purposes.

The preprocessing module 405 also creates a descriptor for each site in the original image 310. In one embodiment, the descriptor is a vector of all the pixel data in the image, such as the RGB values. Thus, for a 32×32 pixel patch, the vector would contain 1,024 entries (3,072 when storing each of the RGB values separately), one for each pixel in the patch. In another embodiment, in order to improve processing efficiency, a dimensionality reduction algorithm, such as principal component analysis (PCA), is employed to reduce the amount of data in the descriptor.

The optimization module 140 also comprises a nearest neighbor locating module 410, which identifies, for a given patch (i.e., site or label), labels that are "similar" to that patch, similarity being quantified using a distance function representing a degree of visual likeness. In one embodiment, the nearest neighbor locating module 410 accepts data describing a patch, such as the patch descriptor, and produces as output a set of labels with minimum "distances" (i.e., maximum similarities) to the patch. The desired number of patches in the output set may be specified as input to the nearest neighbor locating module 410, and may designate either a number of patches for each related image 340, or a total number of patches across all the related images 340. The nearest neighbor search does not depend on the labels being aligned on a grid, as is the case with the partitions defined for the original image 310, and therefore the output labels may be located at any pixel locations within their respective related images 340.

The optimization module 140 comprises a partition module 420 which defines the partitions for the original image 310. In one embodiment, the partition module 420 defines partitions comprising sites with size 32×32 pixels (i.e., containing 1024 pixels), with the partitions being inset in either the horizontal or vertical directions by multiples of ¼ the length of a patch, thereby creating 16 distinct partitions. During different iterations, the partition module may also be invoked with different patch sizes. In one embodiment, successive iterations create partitions with patches of sizes 32×32, 16×16 and 8×8. Additionally the iterations may operate upon the images in a multi-resolution fashion. For example, the first set of iterations may be performed on down-sampled versions of the original image 310 and the related images 340. Down-sampling reduces the size of an image by certain amount. In one embodiment, the original and related images 310, 340 are down-sampled to one eighth of their original size, processed in that iteration, then are down-sampled to one quarter of the original size for a next set of iterations. (Any synthesized images produced in an iteration can be up-sampled as initialization for the next iteration.) This process continues, using successively less down-sampling in later iterations, until the size matches the original size and no down-sampling need be employed.

The optimization module 140 further comprises an iteration module 425 which causes successive rounds of candidate identification and selection to be performed by candidate identification module 430 and candidate selection module 440, as described further below. This results in selecting a "best" candidate label—i.e. the candidate label having the greatest similarity (equivalently, least distance) to a site patch—for each site patch in each partition of the original image 310. The iteration module 425 stops iterating once an end condition—such as achieving image convergence, or completion of a predetermined number of iterations—has been satisfied.

The optimization module 140 further comprises a candidate identification module 430 which identifies, for a given site of the original image 310, a set of candidate labels from the related images 340 that are considered likely to serve as effective replacements of the low-resolution image data of the site. In one embodiment, the candidates are drawn from four different classes of labels, which are grouped together to form a candidate list of labels for the site.

A first class of candidate labels consists of the nearest neighbors of the site itself. That is, for a given site S, the candidate identification module 430 extracts the patch image data for S, and provides its descriptor to the nearest neighbor location module 410, which then returns a set of visually similar labels from the related images 340. Thus, this class consists of a set of patches similar to the site itself.

Another class of candidate labels consists of labels predicted by the labels for overlapping sites. For example, referring to FIGS. 3A-3C, assume that site patch 316A has previously been found to have a best label 342A. Then, when predicting a label for site patch 318, which is offset from the patch 316A in both the horizontal and vertical directions by one half the width of a patch, it is predicted that a good candidate label for site patch 318 would be offset from the label 342A by the same amount, e.g. label 342C. Similarly, other labels could be predicted by the other overlapping site patches 316B-D, in addition to the upper-left site 316A. This manner of prediction encourages the use of contiguous patches when finding labels to replace the site data, based on the desirability of having the smooth transitions between patches that contiguous patches provide. That is, if the image data within sites 316A and 318 were replaced with the higher resolution image data from sites 342A and 342C, respectively, then not only would the image data be from the same general region of related image 340A, but the overlap region 320 would have the exact same data. Thus, the transition would appear very smooth to a human viewer.

Another class of labels consists of the nearest neighbors of the labels predicted by the labels for overlapping sites. The nearest neighbors are determined in the same manner as that discussed above with respect to the nearest neighbors of the site.

Yet another class of labels for the given site consists of nearest neighbors of patches created by combining labels assigned to corresponding overlapping sites from other partitions. For example, the site 318 overlaps with the four sites 316A-316D in partition 312. For the particular case of the two partitions shown in the figure, all four of the sites from 316A-316D overlap with 318 in regions one quarter of site 318. For example, the bottom-right quarter of site 316A overlaps with the top-left quarter of site 318 (shown as region 320), while the other three quarters (one each from 316B, 316C and 316D) overlap with other different quarters of site 318. Together the four quarters overlap fully with site 318. A new composite patch is formed by assembling the relevant portions of the labels of these four quarter patches into one full patch, e.g. by taking the bottom-right quarter of the label assigned to site 316A, the bottom-left quarter of the label assigned to site 316B, etc. The nearest neighbors of this new composite patch are considered candidate labels for site 318. Additional candidates are found using the same process for each site of each other partition defined for the original image 310, as well. Note that for partitions where the overlapping sites cover different unequal portions of the site, the same procedure can be applied except that the newly constructed patch is formed by combining the overlapping regions of unequal sizes.

These different classes of labels are all merged into a single candidate list, and each is evaluated to determine the quality of the match that it provides for the given site, as further described below.

The optimization module 140 further comprises a candidate selection module 440 which accepts as input the list of candidate labels for a given site, evaluates the quality of each candidate with respect to the given site, and selects the highest quality (or "best") label to represent the given site. In one embodiment, the candidate selection module 440 evaluates label quality according to an function (referred to as an energy function) that includes two distinct components: the difference between the given lower-resolution site and the higher-resolution label (referred to as the "data cost"), and the difference between the label of the site and the labels of sites from other partitions that overlap the given site (referred to as the "smoothness cost"). The data cost tends to ensure that the chosen label is a good match with the site itself, and the smoothness cost tends to ensure that the chosen label is a good match with the labels assigned to overlapping sites from other partitions, so that the visual transition between labels appears smooth to a viewer.

As noted above, the data cost component of the energy function compares the lower-resolution site image data and the higher-resolution label image data. In one embodiment, this is accomplished by comparing the raw image data for the site and label patches, such as by converting the higher-resolution label data to be equivalent in resolution to that of the site data, and then comparing corresponding pixels, such as by counting the number of pixels that differ, computing a sum of the differences of color values for the corresponding pixels, or other techniques that would be known to one of skill in the art.

In another embodiment, in order to speed up comparisons and to better account for differences in resolution of the site image data and the label image data—e.g., between a low-resolution patch from the original image 310 and a high-resolution label from a related image 340—the data cost component is designed to adapt to the frequency content of the patch. More specifically, in an initial preprocessing operation performed once for each of the original image 310 and the related images 340, a wavelet transformation is computed over the image. In other embodiments, another texture-sensitive transformation, such as a Gabor filter, could be used instead of the wavelet transformation. This transformation results in a number of coefficients corresponding to each patch (e.g., coefficients from a wavelet transformation). Then, for each patch of the image, the wavelet coefficients are summed to determine the total value of the patch. The top wavelet coefficients sufficient to represent some threshold percentage of the total value, such as 80%, or 95%, are retained, and the other coefficients are set to zero. This focuses on the high-frequency coefficients for high-resolution patches and the low-resolution coefficients for low-resolution patches. The selected coefficients can be viewed as a mask or weighting over the original coefficients. The mask can be used to define an asymmetric cost function for matching label patches against patches of the original image 310. To compare a label patch against an original image patch, the mask of the original image patch is used for both patches. This ensures that the cost depends on the frequency content of the original image patch. This implies that low-resolution regions in the original image 310 will only match against low-resolution content of the label patch, while high-resolution regions will also match against high-frequency content.

As noted above, the smoothness cost component of the energy function measures discrepancy between the label and the labels of sites from other partitions that overlap the given site. In one embodiment, the discrepancy, or "distance," between labels is measured as the sum of the pixel differences for the overlapping regions, such as a total number of pixels that differ, or a sum of the amounts of the color differences between pairs of corresponding pixels. For example, referring to FIG. 3, assume that site 316 had been assigned label 342A, and that site 318 had been assigned label 342B. For site 318 (having label 342B) in partition 314, one of the corresponding overlapping sites is site 316A (having label 342A) The distance between labels 342A and 342B is determined based on portion 320—that is, the smoothness cost component is the difference between the pixels of the lower-right quarter of label 342A, and of the upper-left quarter of label 342B. To determine the total smoothness cost of assigning label 342B to site 318, such distances are computed over all four sites 316A-316D from partition 312 and then summed. In another embodiment, the total smoothness cost is computed by constructing a new composite patch from the overlapping portions of the four overlapping sites, as explained above, and then computing the distance between the new composite patch and label 342B.

For embodiments with a greater number of partitions defined than the two depicted in FIG. 3 (e.g. 16 partitions), there will be a far larger number of overlapping patches. That is, assuming that there is a set of N partitions (other than the partition containing site s itself), then the smoothness cost SC for a given site s can be expressed as $$SC(s) = |Z_1 - Z_s| + |Z_2 - Z_s| + \ldots + |Z_N - Z_s|$$

or alternatively as $$SC(s) = |Z_1 - Z_s|^2 + |Z_2 - Z_s|^2 + \ldots + |Z_N - Z_s|^2$$

where $Z_s$ denotes the label for the site s and $Z_i$ denotes new composite patches that are constructed by combining portions of labels of sites in partition i (of the N partitions) that overlap with site s, as explained above. $|Z_i - Z_s|$ denotes the distance (difference) between $Z_i$ and $Z_s$ according to some distance metric, such as the pixel differences. Note that this requires performing N distance calculations, one for each of the N other partitions. It can be shown for either of these formulations that the smoothness cost is proportional to the distance between s and the average of the corresponding overlapping labels from the partitions. For example, it can be shown that $$SC(s) = |Z_1 - Z_s|^2 + |Z_2 - Z_s|^2 + \ldots + |Z_N - Z_s|^2 = N^* |Z_s - (Z_1 + Z_2 + \ldots + Z_N)/N|^2 + K$$

where $(Z_1 + Z_2 + \ldots + Z_N)/N$ denotes the average value of the corresponding newly constructed composite patches in each of the N partitions, and K is a value that is independent of $Z_s$, and hence can be ignored since it does not affect the outcome of $Z_s$. Since this quantity is not a function of the label $Z_s$ (to be determined) of site s for which the smoothness cost is being computed, it need be computed only once per iteration, and minimizing it is equivalent to minimizing the other formulations of smoothness cost. Thus, rather than being required to compute N label distances for an iteration (one for each of the N partitions), the average of the labels need be computed only once for that iteration, and the distance determined only once for a given site s. This greatly reduces the amount of processing needed to compute the smoothness cost. One can also show a similar result to be true for the case when the distance function is a sum of absolute differences, as opposed to the squared differences described above. That is, minimizing $$SC(s) = |Z_1 - Z_s| + |Z_2 - Z_s| + \ldots + |Z_N - Z_s|$$

is equivalent to minimizing $$SC'(s) = |Z_s - \text{median}(Z_1, Z_2, \ldots Z_N)|$$

where $\text{median}(Z_1, Z_2, \ldots Z_N)$ denotes the median of all newly constructed composite patches in the N partitions, the median value being computed independently for each pixel. This median computation is again independent of the label $Z_s$.

The amount of required processing can be further reduced by the use of caching. For example, where the patch vectors are reduced to lower dimensions using principal component analysis (PCA) or other dimensionality reduction algorithms, the PCA features can be cached for each patch to avoid recomputation. Further, the patch-to-patch distances (e.g., between sites and labels, or between pairs of labels) can be cached after being computed for the first time. Such caching is particularly useful for situations where a number of contiguous patches are chosen as labels for sites, since contiguous patches have low smoothness costs and thus tend to change infrequently, thus maximizing the benefit of caching the information associated with those patches.

In one embodiment, caching is employed to compute an approximation of the smoothness cost, $SC_A(s)$. The approximation does not use the composite rendered patches $Z_i$, but rather uses the labels predicted by the labels for overlapping sites, a class of candidate labels described above. More specifically, $SC_A(s)$ is defined as follows:

$$SC_A(s) = |Z_s - I_1| + |Z_s - I_2| + \ldots + |Z_s - I_N|$$

where $Z_s$, is the label for site s, and $I_i$ is the predicted candidate label from overlapping site i. Since all the elements (i.e., $Z_s$, and $I_i$) are labels of the related images 340, rather than composite images formed out of a number of labels from different overlapping sites at each iteration, the distances between the elements can be pre-computed or computed just once, and then cached. Since generally most candidate labels and patches from the related images 340 remain similar across iterations, their cached distances may generally be reused, thereby decreasing the number of required computations.

In one embodiment, the overall energy function value for a given candidate label for a site is the sum of the data cost and the smoothness cost. In one embodiment, the resolution of the image from which a given candidate label is extracted may also be taken into consideration, e.g. by reducing the computed energy value of the given candidate label by a constant amount, or by a percentage of the energy value. Since the data cost and smoothness cost both represent distances (differences), and thus are preferably low in value in order to achieve a good match between a label and its corresponding site, the candidate selection module 440 selects the label having the lowest energy function value as the best label for a given site.

In one embodiment, the energy value of the best label is compared to a predetermined threshold, and if it exceeds the threshold (i.e., is a weaker match than indicated by the threshold), then the image data from the site itself is retained, rather than being replaced by or combined with the image data of the best candidate label. This prevents changing portions of the original image 310 for which there is no sufficiently strong match in any of the related images 340.

In one embodiment, this best label is immediately associated with the given site as its label for that iteration, which means that its value may be factored into the candidate determination calculations of other sites for that same iteration. For example, the determination of the nearest neighbors of the labels of other sites in a partition would likely have a different outcome if the label for one of the patches were updated before the end of the iteration than if it were not. In this embodiment, the labels of all sites within the same partition are updated together, as soon as best labels for all sites within that partition have been determined. In other embodiments, the best labels are only assigned after the iteration is complete, so that all the labels used in one iteration to calculate a new set of best labels are those assigned at the end of the prior iteration.

Note that both the identification of candidate labels performed by the candidate identification module 430 and the selection of the best candidate performed by the candidate selection module 440 do not, for a given partition, rely on the data for any other of the sites within that partition. Thus, the selection of the best candidate labels for the sites within a partition can be performed in parallel on a different processing unit, e.g. on a multicore computer or cluster of computers, with each core or computer finding the best labels for one of the sites.

Process of Image Enhancement

Figure 5:
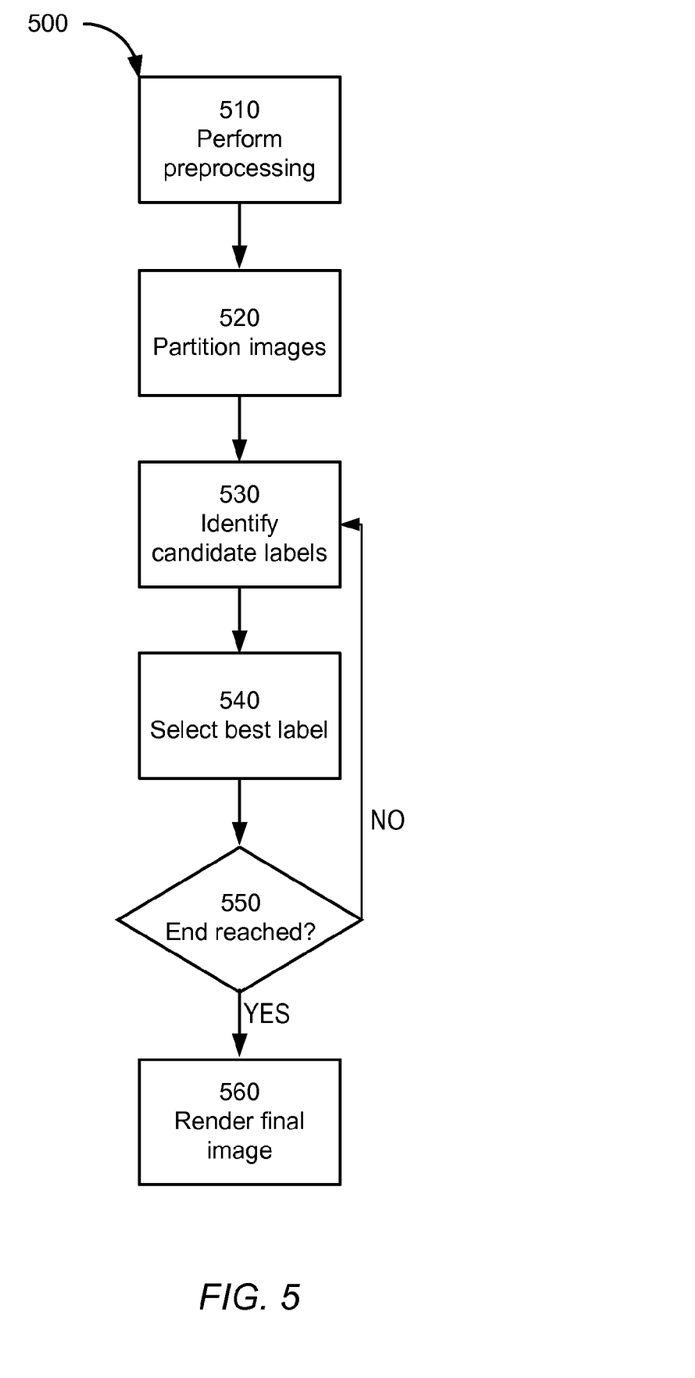
FIG. 5 is a flowchart illustrating a high-level view of steps carried out by the image processing system of FIG. 1 for creating an enhanced resolution version of an original image, according to one embodiment.

FIG. 5 is a flowchart illustrating a high-level view of steps carried out by the image processing system 100 for creating an enhanced version of an original image, according to one embodiment.

Initially, any preliminary steps, such as preprocessing 510, are performed. Such steps include identifying the related images 340 that could be of relevance to the original image 305 and from which labels (replacement patches) should be sought. Preliminary steps also include creating descriptors for the various patches.

At step 520, the image processing system 100 defines partitions for the original image 305, as further described above with respect to FIG. 4.

Next, the image processing system 100 iteratively defines and selects candidate labels for sites of the input image 305. More specifically, for each site of each partition, the candidate identification module 430 identifies 530 a set of candidate labels that are expected to be potentially good matches for the site. These candidates include nearest neighbors of the site patch itself, labels predicted by labels for overlapping sites from other partitions (and the nearest neighbors thereof), and nearest neighbors of composite patches formed from portions of labels assigned to partially overlapping sites from other partitions.

Each of these candidate labels is then evaluated with respect to an energy function, which includes a data cost component that determines the difference between the site and the candidate label, and a smoothness cost component that determines the difference between the label of the site and the labels of sites of other partitions that overlap the given site. The best label—i.e., the label having the minimum energy value with respect to the given site—is then selected 540. At the end of an iteration, every site of the input image 305 has associated with it exactly one label from one of the related images 340.

The image processing system 100 continues to iterate, identifying candidate labels and selecting the best of these candidates for each site of each partition. Thus, at the end of an iteration, each site of each partition of the original image 310 has been assigned exactly one label from one of the related images 340. These best labels then act as input for the next iteration, if any. At the end of each iteration, in order to determine whether to proceed to a next iteration, the optimization module 140 tests to determine whether an end condition has been satisfied 550. One such end condition is simply the completion of a predetermined number of iterations. Another end condition is the achieving of convergence. For example, if some sufficiently great percentage of the assigned labels (e.g., 100%, or 98%) does not change from the prior iteration, then convergence can be deemed to have occurred. Alternatively, convergence can be inferred if there is less than some threshold change in the total energy value for sites whose labels changed—that is, if the sum of the energies for the changed labels has not been reduced by more than the threshold, then convergence has been achieved.

Note that of the four classes of candidate labels described above, the first class of label depends only on the data of the site itself, whereas the latter three classes depend on the data of labels found to correspond to the other sites. Thus, only the first class is evaluated on the first iteration. In subsequent iterations, when a best label has been assigned to each site by the prior iteration, the other three classes of label may be evaluated based on the best labels.

Once the optimization phase has been completed, the result is a set of labels, one per site of the original image. Then, a final, higher resolution enhanced image is rendered 560 using these labels. Since the input to the rendering phase 560 is merely a set of label patches, without any combination of the labels having been previously performed, the rendering algorithm is free to combine the labels in any fashion desired to form the final output image. That is, the rendering phase is independent of the optimization phase. Thus, various alternative ways of rendering the image may be employed in different embodiments. In one embodiment, the data for the set of all partitions is averaged. That is, for every pixel location, the set of pixels at that location across the partitions are collected and their average value (or, in another embodiment, their median value) computed and used as the result at that location in the enhanced image. In other embodiments, a graph cut algorithm is used to stitch together the different labels into the final enhanced image, and in another embodiment, Poisson blending is employed to join the labels. If there are any sites for which no label was assigned, then the original site patch can be used, with its data upsampled sufficiently to fill the space for that patch in the enhanced image, which has resolution greater than that of the original image 105.

Finally, the resulting rendering output image is stored in the enhanced images repository 115. It may then later be provided in response to a client request in the place of its original lower-resolution version stored in the original images repository 105.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of enhancing an image, comprising:
   receiving an original image;
   automatically defining, by a processor, a set of sites for the original image, each site being a candidate to be patched and having a first resolution;
   receiving one or more images related to the original image; and
   for a first site of the set of sites, performing operations comprising:
      identifying a plurality of candidate labels from the one or more related images, each candidate label being a pixel region of one of the related images that is a potential patch for the first site and that has a second resolution higher than the first resolution;
      producing down-sampled label data by converting a label of the candidate labels from the second resolution to the first resolution;
      performing a pixel-by-pixel comparison of pixels in the down-sampled label data with corresponding pixels of the first site;
      determining a degree of difference between the label and the first site based on the pixel-by-pixel comparison;
      automatically selecting the label as a patch for the first site, the label selected responsive at least in part to the degree of difference between the label and the first site; and
      enhancing the image by applying the patch to the first site.

2. The computer-implemented method of claim 1, further comprising selecting the label responsive at least in part to a determined degree of difference between the label and labels previously selected as patches for sites that overlap the first site.

3. The computer-implemented method of claim 1, wherein the set of sites is defined by a plurality of partitions, each partition comprising a non-overlapping subset of the sites that are aligned on a common grid, the partitions being offset such that sites in different partitions partially overlap, wherein patches selected for partially overlapping sites are combined to form composite patches.

4. The computer-implemented method of claim 1, further comprising iteratively performing the operations for the first site until an end condition is reached.

5. The computer-implemented method of claim 1, wherein enhancing the image comprises:
  substituting pixel data of the patch at the second resolution for pixel data of the first site in the original image at the first resolution, thereby creating an enhanced output image; and
  storing the enhanced output image.

6. The computer-implemented method of claim 5, wherein the substituting of pixel data is performed via Poisson blending of the pixel data of the first site with pixel data of surrounding sites.

7. The computer-implemented method of claim 1, wherein enhancing the image comprises:
  combining pixel data of the patch at the second resolution with pixel data of the first site in the original image at the first resolution, thereby creating an enhanced output image; and
  storing the enhanced output image.

8. The computer-implemented method of claim 1, wherein the pixel-by-pixel comparison includes determining at least one of: a number of corresponding pixels that differ between the down-sampled label data and the first site, and a sum of differences of color values for corresponding pixels in the down-sampled label data and the first site.

9. A non-transitory computer-readable storage medium storing a computer program executable by a processor for enhancing an image, the actions of the computer program comprising:
  receiving an original image;
  automatically defining, by a processor, a set of sites for the original image, each site being a candidate to be patched and having a first resolution;
  receiving one or more images related to the original image; and
  for a first site of the set of sites, performing operations comprising:
    identifying a plurality of candidate labels from the one or more related images, each candidate label being a pixel region of one of the related images that is a potential patch for the first site and that has a second resolution higher than the first resolution;
    producing down-sampled label data by converting a label of the candidate labels from the second resolution to the first resolution;
    performing a pixel-by-pixel comparison of pixels in the down-sampled label data with corresponding pixels of the first site;
    determining a degree of difference between the label and the first site based on the pixel-by-pixel comparison;
    automatically selecting the label as a patch for the first site, the label selected responsive at least in part to the degree of difference between the label and the first site; and
    enhancing the image by applying the patch to the first site.

10. The non-transitory computer readable storage medium of claim 9, wherein the set of sites is defined by a plurality of partitions, each partition comprising a non-overlapping subset of the sites that are aligned on a common grid, the partitions being offset such that sites in different partitions partially overlap, wherein patches selected for partially overlapping sites are combined to form composite patches.

11. The non-transitory computer-readable storage medium of claim 9, wherein enhancing the image comprises:
  substituting pixel data of the patch at the second resolution for pixel data of the first site in the original image at the first resolution, thereby creating an enhanced output image; and
  storing the enhanced output image.

12. The non-transitory computer-readable storage medium of claim 9, wherein enhancing the image comprises:
  combining pixel data of the patch at the second resolution with pixel data of the first site in the original image at the first resolution, thereby creating an enhanced output image; and
  storing the enhanced output image.

13. The non-transitory computer readable storage medium of claim 9, wherein the pixel-by-pixel comparison includes determining at least one of: a number of corresponding pixels that differ between the down-sampled label data and the first site, and a sum of differences of color values for corresponding pixels in the down-sampled label data and the first site.

14. The non-transitory computer-readable storage medium of claim 9, wherein determining the degree of difference between the label and the first site comprises:
  identifying a plurality of sites partially overlapping the first site;
  identifying a plurality of labels from one of the one or more related images that were previously assigned to the identified partially overlapping sites;
  computing an average of the identified labels; and
  computing a difference between the first site and the average of the identified labels.

15. The non-transitory computer-readable storage medium of claim 9, wherein the actions of the computer program further comprise iteratively performing the operations for the first site until an end condition is reached.

16. A computer-implemented system for enhancing an image, comprising:
  a processor configured to execute computer program modules, the computer program modules comprising:
    an optimization module performing actions comprising:
      receiving an original image;
      automatically defining, by a processor, a set of sites for the original image, each site being a candidate to be patched and having a first resolution;
      receiving one or more images related to the original image; and
      for a first site of the set of sites, performing operations comprising:
        identifying a plurality of candidate labels from the one or more related images, each candidate label being a pixel region of one of the related images that is a potential patch for the first site and that has a second resolution higher than the first resolution;
        producing down-sampled label data by converting a label of the candidate labels from the second resolution to the first resolution;
        performing a pixel-by-pixel comparison of pixels in the down-sampled label data with corresponding pixels of the first site;

determining a degree of difference between the label and the first site based on the pixel-by-pixel comparison;

automatically selecting the label as a patch for the first site, the label selected responsive at least in part to the degree of difference between the label and the first site; and enhancing the image by applying the patch to the first site.

17. The computer-implemented system of claim 16, wherein the set of sites is defined by a plurality of partitions, each partition comprising a non-overlapping subset of the sites that are aligned on a common grid, the partitions being offset such that sites in different partitions partially overlap, wherein patches selected for partially overlapping sites are combined to form composite patches.

18. The computer-implemented system of claim 16, wherein enhancing the image comprises:

combining pixel data of the patch at the second resolution with pixel data of the first site in the original image at the first resolution, thereby creating an enhanced output image; and storing the enhanced output image.

19. The computer-implemented system of claim 16, wherein the pixel-by-pixel comparison includes determining at least one of: a number of corresponding pixels that differ between the down-sampled label data and the first site, and a sum of differences of color values for corresponding pixels in the down-sampled label data and the first site.

20. The computer-implemented system of claim 16, wherein determining the degree of difference between the label and the first site comprises:

identifying a plurality of sites partially overlapping the first site;

identifying a plurality of labels from one of the one or more related images that were previously assigned to the identified partially overlapping sites;

computing an average of the identified labels; and computing a difference between the first site and the average of the identified labels.

\* \* \* \* \*